United States Patent
Zhamu et al.

(10) Patent No.: US 11,223,064 B2
(45) Date of Patent: Jan. 11, 2022

(54) MULTIVALENT METAL ION BATTERY HAVING A CATHODE LAYER OF PROTECTED GRAPHITIC CARBON AND MANUFACTURING METHOD

(71) Applicant: Global Graphene Group, Inc., Dayton, OH (US)

(72) Inventors: Aruna Zhamu, Springboro, OH (US); Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 0 days.

(21) Appl. No.: 16/548,310

(22) Filed: Aug. 22, 2019

(65) Prior Publication Data

US 2020/0028204 A1    Jan. 23, 2020

Related U.S. Application Data

(62) Division of application No. 15/466,286, filed on Mar. 22, 2017, now Pat. No. 10,411,291.

(51) Int. Cl.
  *H01M 10/054* (2010.01)
  *H01M 4/38* (2006.01)
  *H01M 4/42* (2006.01)
  *H01M 4/44* (2006.01)
  *H01M 4/46* (2006.01)
  (Continued)

(52) U.S. Cl.
  CPC ......... *H01M 10/054* (2013.01); *H01M 4/366* (2013.01); *H01M 4/38* (2013.01); *H01M 4/381* (2013.01); *H01M 4/42* (2013.01); *H01M 4/44* (2013.01); *H01M 4/46* (2013.01); *H01M 4/583* (2013.01); *H01M 4/587* (2013.01); *H01M 4/624* (2013.01); *H01M 4/628* (2013.01); *H01M 4/663* (2013.01); *H01M 4/70* (2013.01); *H01M 10/0567* (2013.01); *H01M 10/0568* (2013.01); *H01M 10/0569* (2013.01); *H01M 10/36* (2013.01); *H01M 2300/0002* (2013.01)

(58) Field of Classification Search
None
See application file for complete search history.

(56) References Cited

U.S. PATENT DOCUMENTS 2,798,878 A    7/1957 Hummers
4,139,474 A    2/1979 Watanabe et al.
(Continued)

OTHER PUBLICATIONS

U.S. Appl. No. 15/463,543 Final Office Action dated Sep. 3, 2019, 13 pages.
(Continued)

*Primary Examiner* — Daniel S Gatewood

(57) ABSTRACT

Provided is a method of producing a multivalent metal-ion battery comprising an anode, a cathode, and an electrolyte in ionic contact with the anode and the cathode to support reversible deposition and dissolution of a multivalent metal, selected from Ni, Zn, Be, Mg, Ca, Ba, La, Ti, Ta, Zr, Nb, Mn, V, Co, Fe, Cd, Cr, Ga, In, or a combination thereof, at the anode, wherein the anode contains the multivalent metal or its alloy as an anode active material and the cathode comprises a cathode active layer of graphitic carbon particles or fibers that are coated with a protective material. Such a metal-ion battery delivers a high energy density, high power density, and long cycle life.

7 Claims, 7 Drawing Sheets

(51) Int. Cl.
*H01M 4/587* (2010.01)
*H01M 4/66* (2006.01)
*H01M 4/70* (2006.01)
*H01M 4/36* (2006.01)
*H01M 4/583* (2010.01)
*H01M 4/62* (2006.01)
*H01M 10/0567* (2010.01)
*H01M 10/0568* (2010.01)
*H01M 10/0569* (2010.01)
*H01M 10/36* (2010.01)

(56) References Cited

U.S. PATENT DOCUMENTS

| | | | |
|---|---|---|---|
| 4,812,375 | A | 3/1989 | Foster |
| 5,344,726 | A | 9/1994 | Tanaka et al. |
| 5,567,539 | A | 10/1996 | Takahashi et al. |
| 5,874,166 | A * | 2/1999 | Chu ............... H01M 4/587 423/447.2 |
| 6,187,475 | B1 | 2/2001 | Oh et al. |
| 6,337,155 | B1 | 1/2002 | Takei et al. |
| 8,663,844 | B2 | 3/2014 | Kang et al. |
| 9,203,084 | B2 | 12/2015 | Wang et al. |
| 2005/0271574 | A1 | 12/2005 | Jang et al. |
| 2009/0061312 | A1 | 3/2009 | Zhamu et al. |
| 2009/0068553 | A1 | 3/2009 | Firsich |
| 2011/0091777 | A1 * | 4/2011 | Mizuno ............... H01M 4/525 429/403 |
| 2011/0165466 | A1 * | 7/2011 | Zhamu ............... H01M 4/136 429/231.8 |
| 2012/0171574 | A1 * | 7/2012 | Zhamu ............... H01M 4/583 429/300 |
| 2013/0052489 | A1 | 2/2013 | Zhamu et al. |
| 2013/0260246 | A1 | 10/2013 | Chen et al. |
| 2015/0249261 | A1 * | 9/2015 | Dai ............... H01M 10/054 429/336 |
| 2015/0255792 | A1 | 9/2015 | Xu et al. |
| 2016/0301096 | A1 | 10/2016 | Zhamu et al. |
| 2016/0372795 | A1 * | 12/2016 | Xu ............... H01M 10/36 |

OTHER PUBLICATIONS

U.S. Appl. No. 15/463,543 Nonfinal Office Action dated Feb. 13, 2020, 11 pages.
PCT/US18/20557 International Search Report and Written Opinion dated Aug. 1, 2018, 7 pages.
U.S. Appl. No. 15/463,543 Nonfinal Office Action dated May 16, 2019, 20 pages.
U.S. Appl. No. 15/463,555 Nonfinal Office Action dated May 16, 2019, 15 pages.
U.S. Appl. No. 15/466,286 Final Office Action dated Nov. 30, 2018, 14 pages.
U.S. Appl. No. 15/466,286 Nonfinal Office Action dated Nov. 7, 2018, 14 pages.

* cited by examiner

MULTIVALENT METAL ION BATTERY HAVING A CATHODE LAYER OF PROTECTED GRAPHITIC CARBON AND MANUFACTURING METHOD

CROSS REFERENCE TO RELATED APPLICATIONS

The present application is a divisional of U.S. patent application Ser. No. 15/466,286 filed on Mar. 22, 2017, the contents of which is hereby incorporated by reference for all purposes.

FIELD

The present disclosure relates generally to the field of rechargeable multivalent metal battery (e.g. zinc-, nickel-, calcium-, or magnesium-ion battery, etc.) and, more particularly, to a cathode layer containing graphitic carbon particles or fibers and a method of manufacturing the multivalent metal-ion battery.

BACKGROUND

Historically, today's most favorite rechargeable energy storage devices—lithium-ion batteries—was actually evolved from rechargeable "lithium metal batteries" that use lithium (Li) metal as the anode and a Li intercalation compound (e.g. $MoS_2$) as the cathode. Li metal is an ideal anode material due to its light weight (the lightest metal), high electronegativity (−3.04 V vs. the standard hydrogen electrode), and high theoretical capacity (3,860 mAh/g). Based on these outstanding properties, lithium metal batteries were proposed 40 years ago as an ideal system for high energy-density applications.

Due to some safety concerns of pure lithium metal, graphite was implemented as an anode active material in place of the lithium metal to produce the current lithium-ion batteries. The past two decades have witnessed a continuous improvement in Li-ion batteries in terms of energy density, rate capability, and safety. However, the use of graphite-based anodes in Li-ion batteries has several significant drawbacks: low specific capacity (theoretical capacity of 372 mAh/g as opposed to 3,860 mAh/g for Li metal), long Li intercalation time (e.g. low solid-state diffusion coefficients of Li in and out of graphite and inorganic oxide particles) requiring long recharge times (e.g. 7 hours for electric vehicle batteries), inability to deliver high pulse power, and necessity to use pre-lithiated cathodes (e.g. lithium cobalt oxide, as opposed to cobalt oxide), thereby limiting the choice of available cathode materials. Further, these commonly used cathode active materials have a relatively low lithium diffusion coefficient (typically $D \sim 10^{-16}$–$10^{-11}$ $cm^2/sec$). These factors have contributed to one major shortcoming of today's Li-ion batteries—a moderate energy density (typically 150-220 $Wh/kg_{cell}$), but extremely low power density (typically <0.5 kW/kg).

Supercapacitors are being considered for electric vehicle (EV), renewable energy storage, and modern grid applications. The relatively high volumetric capacitance density of a supercapacitor (10 to 100 times greater than those of electrolytic capacitors) derives from using porous electrodes to create a large surface area conducive to the formation of diffuse double layer charges. This electric double layer capacitance (EDLC) is created naturally at the solid-electrolyte interface when voltage is imposed. This implies that the specific capacitance of a supercapacitor is directly proportional to the specific surface area of the electrode material, e.g. activated carbon. This surface area must be accessible by the electrolyte and the resulting interfacial zones must be sufficiently large to accommodate the EDLC charges.

This EDLC mechanism is based on surface ion adsorption. The required ions are pre-existing in a liquid electrolyte and do not come from the opposite electrode. In other words, the required ions to be deposited on the surface of a negative electrode (anode) active material (e.g., activated carbon particles) do not come from the positive electrode (cathode) side, and the required ions to be deposited on the surface of a cathode active material do not come from the anode side. When a supercapacitor is re-charged, local positive ions are deposited close to a surface of a negative electrode with their matting negative ions staying close side by side (typically via local molecular or ionic polarization of charges). At the other electrode, negative ions are deposited close to a surface of this positive electrode with the matting positive ions staying close side by side. Again, there is no exchange of ions between an anode active material and a cathode active material.

In some supercapacitors, the stored energy is further augmented by pseudo-capacitance effects due to some local electrochemical reactions (e.g., redox). In such a pseudo-capacitor, the ions involved in a redox pair also pre-exist in the same electrode. Again, there is no exchange of ions between the anode and the cathode.

Since the formation of EDLC does not involve a chemical reaction or an exchange of ions between the two opposite electrodes, the charge or discharge process of an EDL supercapacitor can be very fast, typically in seconds, resulting in a very high power density (typically 3-10 kW/Kg). Compared with batteries, supercapacitors offer a higher power density, require no maintenance, offer a much higher cycle-life, require a very simple charging circuit, and are generally much safer. Physical, rather than chemical, energy storage is the key reason for their safe operation and extraordinarily high cycle-life.

Despite the positive attributes of supercapacitors, there are several technological barriers to widespread implementation of supercapacitors for various industrial applications. For instance, supercapacitors possess very low energy densities when compared to batteries (e.g., 5-8 Wh/kg for commercial supercapacitors vs. 10-30 Wh/kg for the lead acid battery and 50-100 Wh/kg for the NiMH battery). Modern lithium-ion batteries possess a much higher energy density, typically in the range from 150-220 Wh/kg, based on the cell weight.

In addition to lithium-ion cells, there are several other different types of batteries that are widely used in society: alkaline $Zn/MnO_2$, nickel metal hydride (Ni-MH), lead-acid (Pb acid), and nickel-cadmium (Ni—Cd) batteries. Since their disclosure in 1860, alkaline $Zn/MnO_2$ batteries have become a highly popular primary (non-rechargeable) battery. It is now known that the $Zn/MnO_2$ pair can constitute a rechargeable battery if an acidic salt electrolyte, instead of basic (alkaline) salt electrolyte, is utilized. However, the cycle life of alkaline manganese dioxide rechargeable batteries has been limited to typically 20-30 cycles due to irreversibility associated with $MnO_2$ upon deep discharge and formation of electrochemically inactive phases.

Additionally, formation of a haeterolite ($ZnO:Mn_2O_3$) phase during discharge, when Zn penetrates into the lattice structure of $MnO_2$, has made battery cycling irreversible. The Zn anode also has limitations on cycle life due to the redistribution of Zn active material and formation of dendrites during recharge, causing internal short-circuits. Attempts to solve some of these issues have been made by Oh, et al. [S. M. Oh, and S. H. Kim, "Aqueous Zinc Sulfate (II) Rechargeable Cell Containing Manganese (II) Salt and Carbon Powder," U.S. Pat. No. 6,187,475, Feb. 13, 2001] and by Kang, et al. [F. Kang, et al. "Rechargeable Zinc Ion Battery", U.S. Pat. No. 8,663,844, Mar. 4, 2014]. However, long-term cycling stability and power density issues remain to be resolved. Due to these reasons, the commercialization of this battery has been limited.

Xu, et al. US Pub. No. 20160372795 (Dec. 22, 2016) and US Pub. No. 20150255792 (Sep. 10, 2015) reported Ni-ion and Zn-ion cells, respectively, which both make use of graphene sheets or carbon nanotubes (CNTs) as the cathode active material. Although these two patent applications claim an abnormally high specific capacity of 789-2500 mAh/g based on the cathode active material weight, there are several serious problems associated with these two cells:

(1) There is no plateau portion in the charge or discharge curves (voltage vs. time or voltage vs. specific capacity), unlike typical lithium-ion batteries. This lack of a voltage curve plateau means the output voltage being non-constant (varying too much) and would require a complicated voltage regulation algorithm to maintain the cell output voltage at a constant level.

(2) Actually, the discharge curve for the Ni-ion cell exhibits an extremely sharp drop in voltage from 1.5 volts to below 0.6 volts as soon as the discharge process begins and, during most of the discharge process, the cell output is below 0.6 volts, which is not very useful. As a point of reference, the alkaline cell (a primary battery) provides an output voltage of 1.5 volts.

(3) The discharge curves are characteristic of surface adsorption or electroplating mechanisms at the cathode, as opposed to ion intercalation. Further, it appears that the main event that occurs at the cathode during the battery discharge is electroplating. The high specific capacity values reported by Xu, et al. are simply a reflection on the high amount of Ni or Zn metal electroplated on the surfaces of graphene or CNTs. Since there is an excess amount of Ni or Zn in the anode, the amount of electroplated metal increases as the discharge time increases. Unfortunately, the electrochemical potential difference between the anode and the cathode continues to decrease since the difference in the metal amount between the anode and the cathode continues to decrease (more Zn or Ni is dissolved from the anode and gets electroplated on cathode surfaces). This is likely why the cell output voltage continues to decrease. The cell voltage output would be essentially zero when the amounts of metal at the two electrodes are substantially equivalent or identical. Another implication of this electroplating mechanism is the notion that the total amount of the metal that can be deposited on the massive surfaces at the cathode is dictated by the amount of the metal implemented at the anode when the cell is made. The high specific capacity (as high as 2,500 mAh/g) of graphene sheets at the cathode simply reflects the excessively high amount of Zn provided in the anode. There is no other reason or mechanism for why graphene or CNTs could "store" so much metal. The abnormally high specific capacity values as reported by Xu, et al. were artificially obtained based on the high amounts of Ni or Zn electroplated on cathode material surfaces, which unfortunately occurred at very low voltage values and are of little utility value.

Clearly, an urgent need exists for new cathode materials that provide proper discharge voltage profiles (having a high average voltage and/or a high plateau voltage during discharge), high specific capacity at both high and low charge/discharge rates (not just at a low rate), and long cycle-life for a multivalent metal secondary battery. Hopefully, the resulting battery can deliver some positive attributes of a supercapacitor (e.g. long cycle life and high power density) and some positive features of a lithium-ion battery (e.g. moderate energy density). These are the main objectives of the instant disclosure.

SUMMARY

The disclosure provides a multivalent metal-ion battery comprising an anode, a cathode, and an electrolyte in ionic contact with the anode and the cathode to support reversible deposition and dissolution of a multivalent metal, selected from Ni, Zn, Be, Mg, Ca, Ba, La, Ti, Ta, Zr, Nb, Mn, V, Co, Fe, Cd, Cr, Ga, In, or a combination thereof, at the anode, wherein the anode contains a multivalent metal or its alloy as an anode active material and the cathode comprises a cathode active layer of graphitic carbon particles or fibers as a cathode active material that intercalates/de-intercalates ions of the multivalent metal (and/or ions dissociated from the electrolyte) and wherein the graphitic carbon particles or fibers are coated with a protective layer that is permeable to ions of the multivalent metal or ions dissolved in the electrolyte and the protective layer prevents or reduces exfoliation of graphitic planes in the graphitic carbon particles or fibers during battery charges/discharges.

The graphitic carbon particles or fibers in the cathode active layer may be preferably selected from meso-phase pitch, meso-phase carbon, mesocarbon micro-beads (MCMB), coke particles/needles, expanded graphite flakes, artificial graphite particles, natural graphite particles, amorphous graphite containing graphite micro-crystallites, highly oriented pyrolytic graphite, soft carbon particles, hard carbon particles, multi-walled carbon nanotubes, carbon nano-fibers, carbon fibers, graphite nano-fibers, graphite fibers, carbonized polymer fibers, or a combination thereof.

In some preferred embodiments, the graphitic carbon fibers in the cathode active layer contain needle coke, carbon nano-fiber, carbon fiber, graphite nano-fiber, graphite fiber, or multi-walled carbon nanotube that have a length shorter than 10 µm, preferably shorter than 5 µm, and more preferably shorter than 1 µm. Shorter lengths were found to lead to higher rate capability and higher power densities.

We have surprisingly observed that the intercalation and de-intercalation of ions in and out of the graphitic carbon structure can induce expansion and separation (exfoliation) of graphitic planes (graphene planes), compromising the structural integrity of the cathode electrode. Thus, a protective coating is deposited onto surfaces of the graphitic carbon particles or fibers to prevent or reduce exfoliation of graphitic planes in the graphitic carbon particles or fibers during battery charges/discharges. The protective layer may contain a material selected from reduced graphene oxide, carbonized resin, an ion-conducting polymer, an electrically conductive polymer, or a combination thereof. The protective coating can partially or fully cover the entire surfaces of a graphitic carbon particle or fiber to hold the graphitic planes together (for the purpose of maintaining the structural integrity of the particle/fiber), yet still allowing the ions to permeate through so that the ions can intercalate into the graphitic structure.

This protective material may be selected from reduced graphene oxide (that wraps around the graphitic carbon particles), carbonized resin (or polymeric carbon), ion-conducting polymers (e.g. sulfonated polymers), and electrically conductive polymers. The polymeric carbon may be selected from a polymer of low carbon content (e.g. epoxy resin or polyethylene) or high carbon content (e.g. phenolic resin or polyacrylonitrile) that is heat-treated at 500-1500° C. for 1-10 hours. The electrically conducting polymer may be selected from polyaniline, polypyrrole, polythiophene, polyfuran, a bi-cyclic polymer, derivatives thereof (e.g. sulfonated versions), or a combination thereof.

In some embodiments, the ion-conducting polymers are selected from sulfonated polymers, poly(ethylene oxide) (PEO), Polypropylene oxide (PPO), poly(acrylonitrile) (PAN), poly(methyl methacrylate) (PMMA), poly(vinylidene fluoride) (PVdF), Poly bis-methoxy ethoxyethoxide-phosphazenex, Polyvinyl chloride, Polydimethylsiloxane, poly(vinylidene fluoride)-hexafluoropropylene (PVDF-HFP), and combinations thereof.

The sulfonated polymer may be selected from the group consisting of poly(perfluoro sulfonic acid), sulfonated poly (tetrafluoroethylene), sulfonated perfluoroalkoxy derivatives of polytetrafluoroethylene, sulfonated polysulfone, sulfonated poly(ether ketone), sulfonated poly (ether ether ketone), sulfonated polyimide, sulfonated styrene-butadiene copolymers, sulfonated polystyrene, sulfonated poly chlorotrifluoroethylene (PCTFE), sulfonated perfluoroethylenepropylene copolymer (FEP), sulfonated ethylene-chlorotrifluoroethylene copolymer (ECTFE), sulfonated poly vinylidenefluoride (PVDF), sulfonated copolymers of polyvinylidenefluoride with hexafluoropropene and tetrafluoroethylene, sulfonated copolymers of ethylene and tetrafluoroethylene (ETFE), polybenzimidazole (PBI), their chemical derivatives, copolymers, blends, and combinations thereof.

In certain embodiments, the graphitic carbon particles or fibers have a hard carbon or amorphous carbon surface that is at least partially removed prior to being coated with the protective layer. The hard carbon skin is not permeable to certain ions (larger cations or anions) and, thus, must be at least partially removed. Many graphitic materials intrinsically have a hard carbon skin. These include meso-phase carbon, meso-carbon microbeads, needle coke, carbon nano-fiber, carbon fiber, graphite nano-fiber, and graphite fiber.

We have observed that a select multivalent metal (e.g. Ni, Zn, Be, Mg, Ca, Ba, La, Ti, Ta, Zr, Nb, Mn, V, Co, Fe, Cd, Ga, In, or Cr), when coupled with a presently invented graphitic carbon material, can exhibit a discharge curve plateau at approximately 1.0 volt or higher (e.g. from 0.85 to 3.8 volts). This plateau regime of a discharge voltage vs. time (or capacity) curve enables the battery cell to provide a useful constant voltage output. A voltage output significantly lower than 1 volt is generally considered undesirable. The specific capacity corresponding to this plateau regime is typically from approximately 100 mAh/g to above 600 mAh/g.

This multivalent metal-ion battery can further comprise an anode current collector supporting the multivalent metal or its alloy or further comprise a cathode current collector supporting the cathode active layer. The current collector can be a mat, paper, fabric, foil, or foam that is composed of conducting nano-filaments, such as graphene sheets, carbon nanotubes, carbon nano-fibers, carbon fibers, graphite nano-fibers, graphite fibers, carbonized polymer fibers, or a combination thereof, which form a 3D network of electron-conducting pathways. The high surface areas of such an anode current collector not only facilitate fast and uniform dissolution and deposition of metal ions, but also act to reduce the exchange current density and, thus, the tendency to form metal dendrites that otherwise could cause internal shorting.

In the invented multivalent metal-ion battery, the electrolyte may contain $NiSO_4$, $ZnSO_4$, $MgSO_4$, $CaSO_4$, $BaSO_4$, $FeSO_4$, $MnSO_4$, $CoSO_4$, $VSO_4$, $TaSO_4$, $CrSO_4$, $CdSO_4$, $GaSO_4$, $Zr(SO_4)_2$, $Nb_2(SO_4)_3$, $La_2(SO_4)_3$, $BeCl_2$, $BaCl_2$, $MgCl_2$, $AlCl_3$, $Be(ClO_4)_2$, $Ca(ClO_4)_2$, $Mg(ClO_4)_2$, $Mg(BF_4)_2$, $Ca(BF_4)_2$, $Be(BF_4)_2$, tri(3,5-dimethylphenyl borane, tris(pentafluorophenyl)borane, Alkyl Grignard reagents, magnesium dibutyldiphenyl, Mg(BPh2Bu2)2, magnesium tributylphenyl Mg(BPhBu3)2), or a combination thereof.

In certain embodiments of the present disclosure, the electrolyte comprises at least a metal ion salt selected from a transition metal sulfate, transition metal phosphate, transition metal nitrate, transition metal acetate, transition metal carboxylate, transition metal chloride, transition metal bromide, transition metal perchlorate, transition metal hexafluorophosphate, transition metal borofluoride, transition metal hexafluoroarsenide, or a combination thereof.

In certain embodiments, the electrolyte comprises at least a metal ion salt selected from a metal sulfate, phosphate, nitrate, acetate, carboxylate, chloride, bromide, or perchlorate of zinc, aluminum, titanium, magnesium, beryllium, calcium, manganese, cobalt, nickel, iron, vanadium, tantalum, gallium, chromium, cadmium, niobium, zirconium, lanthanum, or a combination thereof.

In the multivalent metal-ion battery, the electrolyte comprises an organic solvent selected from ethylene carbonate (EC), dimethyl carbonate (DMC), methylethyl carbonate (MEC), diethyl carbonate (DEC), methyl butyrate (MB), ethyl propionate, methyl propionate, propylene carbonate (PC), γ-butyrolactone (γ-BL), acetonitrile (AN), ethyl acetate (EA), propyl formate (PF), methyl formate (MF), tetrahydrofuran (THF), toluene, xylene, methyl acetate (MA), or a combination thereof.

In certain embodiments, the layer of carbon or graphite material operates as a cathode current collector to collect electrons during a discharge of the battery and wherein the battery contains no separate or additional cathode current collector.

The cathode active layer of graphite may further comprise an electrically conductive binder material which bonds particles or fibers of the carbon or graphite material together to form a cathode electrode layer. The electrically conductive binder material may be selected from coal tar pitch, petroleum pitch, meso-phase pitch, a conducting polymer, a polymeric carbon, or a derivative thereof.

Typically, the invented secondary battery has an average discharge voltage no less than 1 volt (typically from 1.0 to 3.8 volts) and a cathode specific capacity greater than 200 mAh/g (preferably and more typically >300 mAh/g, more preferably >400 mAh/g, and most preferably >500 mAh/g) based on a total cathode active layer weight. Some cells deliver a specific capacity >600 mAh/g.

Preferably, the secondary battery has an average discharge voltage no less than 2.0 volts (preferably >2.5 volts and more preferably >3.0 volts) and a cathode specific capacity greater than 100 mAh/g based on a total cathode active layer weight (preferably and more typically >300 mAh/g, more preferably >400 mAh/g, and most preferably >500 mAh/g).

The present disclosure also provides a method of manufacturing a multivalent metal-ion battery. The method comprises: (a) providing an anode containing a multivalent metal (selected from Ni, Zn, Mg, Ca, Ba, La, Ti, Ta, Zr, Nb, Mn, V, Co, Fe, Cd, Cr, Ga, In, or a combination thereof) or its alloy; (b) providing a cathode active layer of graphitic carbon particles or fibers as a cathode active material that intercalates/de-intercalates ions; and (c) providing an electrolyte capable of supporting reversible deposition and dissolution of the multivalent metal at the anode and reversible adsorption/desorption and/or intercalation/de-intercalation of ions at the cathode; wherein the graphitic carbon particles or fibers are coated with a protective layer that is permeable to ions of the multivalent metal or ions dissolved in the electrolyte and the protective layer prevents or reduces exfoliation of graphitic planes in the graphitic carbon particles or fibers during a charge/discharge cycle of the battery.

In the method, the graphitic carbon particles or fibers in the cathode active layer are selected from meso-phase pitch, meso-phase carbon, mesocarbon micro-beads (MCMB), coke particles/needles, expanded graphite flakes, artificial graphite particles, natural graphite particles, amorphous graphite containing graphite micro-crystallites, highly oriented pyrolytic graphite, soft carbon particles, hard carbon particles, multi-walled carbon nanotubes, carbon nano-fibers, carbon fibers, graphite nano-fibers, graphite fibers, carbonized polymer fibers, or a combination thereof.

The step of providing a cathode active layer may include a procedure of cutting needle coke, carbon nano-fiber, carbon fiber, graphite nano-fiber, graphite fiber, or multi-walled carbon nanotube to obtain graphitic carbon fibers having an average length shorter than 10 µm (preferably shorter than 5 µm and more preferably shorter than 1 µm). Shorter lengths were found to enable higher power densities of the resulting metal-ion cells.

The protective layer may contain a material selected from reduced graphene oxide, carbonized resin, an ion-conducting polymer, an electrically conductive polymer, or a combination thereof. The graphitic carbon particles or fibers may have a hard carbon or amorphous carbon surface that is at least partially removed prior to being coated with the protective layer. The electrolyte contains an aqueous electrolyte, an organic electrolyte, a polymer electrolyte, a molten salt electrolyte, an ionic liquid, or a combination thereof.

The method can further include providing a porous network of electrically conductive nano-filaments to support the multivalent metal or its alloy.

DESCRIPTION OF THE PREFERRED EMBODIMENTS

Figure 1A:
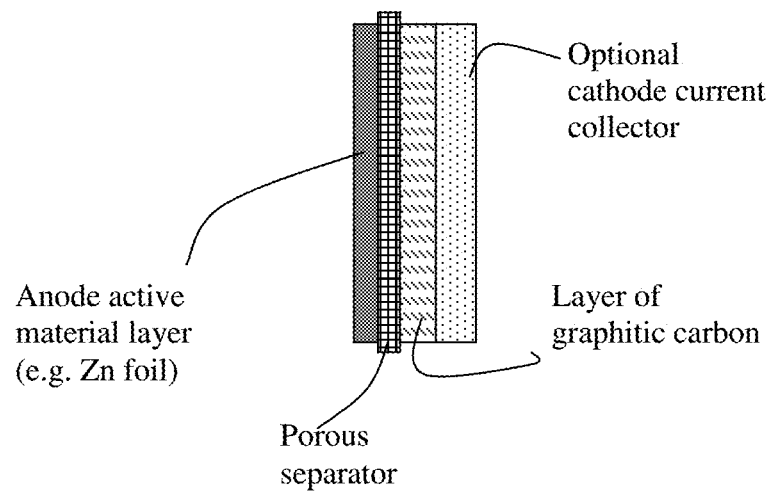
FIG. 1(A) Schematic of a multivalent metal secondary battery, wherein the anode layer is a thin multivalent metal coating or foil and the cathode active material layer contains a layer of graphitic carbon particles or fibers having a protective coating.

As schematically illustrated in the upper portion of FIG. 1(A), bulk natural graphite is a 3-D graphitic material with each graphite particle being composed of multiple grains (a grain being a graphite single crystal or crystallite) with grain boundaries (amorphous or defect zones) demarcating neighboring graphite single crystals. Each grain is composed of multiple graphene planes that are oriented parallel to one another. A graphene plane or hexagonal carbon atom plane in a graphite crystallite is composed of carbon atoms occupying a two-dimensional, hexagonal lattice. In a given grain or single crystal, the graphene planes are stacked and bonded via van der Waal forces in the crystallographic c-direction (perpendicular to the graphene plane or basal plane). The inter-graphene plane spacing in a natural graphite material is approximately 0.3354 nm.

Artificial graphite materials, such as highly oriented pyrolytic graphite (HOPG), also contain constituent graphene planes, but they have an inter-graphene planar spacing, $d_{002}$, typically from 0.336 nm to 0.365 nm, as measured by X-ray diffraction. Both the natural graphite and artificial graphite have a physical density being typically >2.1 $g/cm^3$, more typically >2.2 $g/cm^3$, and most typically very close to 2.25 $g/cm^3$.

Many carbon or quasi-graphite materials (herein referred to as graphitic carbon) also contain graphite crystals (also referred to as graphite crystallites, domains, or crystal grains) that are each composed of stacked graphene planes. However, the structure typically has a high proportion of amorphous or defect zones. These include meso-carbon micro-beads (MCMBs), meso-phase carbon, soft carbon, hard carbon, coke (e.g. needle coke), and carbon or graphite fibers (including vapor-grown carbon nano-fibers or graphite nano-fibers). The multi-walled carbon nanotubes (MW-CNT) does have very little defect or amorphous portion, but each CNT has a tubular structure. Hence, the multi-walled CNTs have a physical density of approximately 1.35 $g/cm^3$. Other types of graphitic carbon have a typical density lower than 2.1 $g/cm^3$, and more typically lower than 2.0 $g/cm^3$, further more typically <1.9 $g/cm^3$, and most typically <1.8 $g/cm^3$.

It may be noted that the "soft carbon" refers to a carbon material containing graphite domains wherein the orientation of the hexagonal carbon planes (or graphene planes) in one domain and the orientation in neighboring graphite domains are not too different or mis-matched from each other so that these domains can be readily merged together when heated to a temperature above 2,000° C. (more typically above 2,500° C.). Such a heat treatment is commonly referred to as graphitization. Thus, the soft carbon can be defined as a carbonaceous material that can be graphitized. In contrast, a "hard carbon" can be defined as a carbonaceous material that contain highly mis-oriented graphite domains that cannot be thermally merged together to obtain larger domains; i.e. the hard carbon cannot be graphitized.

The present disclosure provides a multivalent metal secondary battery comprising an anode, a cathode, an optional porous separator electronically separating the anode and the cathode, and an electrolyte in ionic contact with the anode and the cathode to support reversible deposition and dissolution of the multivalent metal at the anode, wherein the anode contains multivalent metal or its metal alloy as an anode active material and the cathode comprises a layer of graphitic carbon particles or fibers (filaments), preferably selected from meso-phase carbon particles, mesocarbon micro-beads (MCMB), coke particles or needles, soft carbon particles, hard carbon particles, amorphous graphite containing graphite micro-crystallites, multi-walled carbon nanotubes, carbon nano-fibers, carbon fibers, graphite nano-fibers, graphite fibers, or a combination thereof. These graphitic carbon fibers or particles are coated with a thin layer of a protective material.

We have observed that some graphitic carbon materials, such as meso-phase carbon particles, mesocarbon microbeads (MCMB), coke particles or needles, soft carbon particles, hard carbon particles, carbon nano-fibers, carbon fibers, graphite nano-fibers, and graphite fibers, have a thin skin layer of hard carbon naturally formed in their surfaces when these synthetic graphitic carbon particles or fibers are produced. We have surprisingly observed that it is highly beneficial to subject these particles or fibers to a surface treatment (e.g. surface chemical etching, surface plasma cleaning, etc.) to remove some or all of the hard carbon on their exterior surface.

In certain preferred embodiments, the graphitic carbon (e.g. meso-phase carbon particles, MCMBs, coke particles or needles, soft carbon particles, hard carbon particles, amorphous graphite, multi-walled carbon nanotubes, and carbon nano-fibers), with or without the above-stated surface treatment, may be coated with a protective layer that is permeable to multivalent metal ions or ions dissolved in the electrolyte and that prevents or reduces exfoliation of graphitic planes in the graphitic carbon particles or fibers. We have surprisingly observed that, upon repeated intercalation/de-intercalation of multivalent metal ions and other electrolyte-derived ions into and out of the graphitic crystallites or domains could cause expansion of inter-planar spaces between graphene planes and exfoliation of graphene planes (hexagonal carbon atom planes). This effect, although can initially increase the charge storage capacity of the cathode material, later causes severe graphene plane exfoliation to the extent that the cathode layer structural integrity is compromised and the charge storage capability rapidly decays. By depositing a thin layer of protective material on surfaces of the graphitic carbon particles or fibers, one could significantly improve the structural integrity and cycle stability of the cathode layer.

This protective material may be selected from reduced graphene oxide (that wraps around the graphitic carbon particles), carbonized resin (or polymeric carbon), ion-conducting polymers (e.g. sulfonated polymers), and electrically conductive polymers. Reduced graphene oxide sheets have many naturally occurring surface defects (pores) that are permeable to all the ions of interest. The polymeric carbon may be selected from a polymer of low carbon content (e.g. epoxy resin or polyethylene) or high carbon content (e.g. phenolic resin or polyacrylonitrile). The electrically conducting polymer may be selected from polyaniline, polypyrrole, polythiophene, polyfuran, a bi-cyclic polymer, derivatives thereof (e.g. sulfonated versions), or a combination thereof.

In some embodiments, the ion-conducting polymer is selected from a sulfonated polymer, poly(ethylene oxide) (PEO), Polypropylene oxide (PPO), poly(acrylonitrile) (PAN), poly(methyl methacrylate) (PMMA), poly(vinylidene fluoride) (PVdF), Poly bis-methoxy ethoxyethoxide-phosphazenex, Polyvinyl chloride, Polydimethylsiloxane, poly(vinylidene fluoride)-hexafluoropropylene (PVDF-HFP), a combination thereof.

Sulfonation also generates pores that are permeable to metal ions. The sulfonated polymer may be selected from the group consisting of sulfonated poly(perfluoro sulfonic acid), sulfonated poly (tetrafluoroethylene), sulfonated perfluoroalkoxy derivatives of polytetrafluoroethylene, sulfonated polysulfone, sulfonated poly(ether ketone), sulfonated poly (ether ether ketone), sulfonated polyimide, sulfonated styrene-butadiene copolymers, sulfonated polystyrene, sulfonated poly chloro-trifluoroethylene (PCTFE), sulfonated perfluoroethylene-propylene copolymer (FEP), sulfonated ethylene-chlorotrifluoroethylene copolymer (ECTFE), sulfonated poly vinylidenefluoride (PVDF), sulfonated copolymers of polyvinylidenefluoride with hexafluoropropene and tetrafluoroethylene, sulfonated copolymers of ethylene and tetrafluoroethylene (ETFE), polybenzimidazole (PBI), their chemical derivatives, copolymers, blends, and combinations thereof.

The configuration of a multivalent metal secondary battery is now discussed as follows:

A multivalent metal-ion battery includes a positive electrode (cathode), a negative electrode (anode), and an electrolyte typically including a metal salt and a solvent. The anode can be a thin foil or film of a multivalent metal or its alloy with another element(s); e.g. 0-10% by weight of Sn in Zn. The multivalent metal may be selected from Ni, Zn, Be, Mg, Ca, Ba, La, Ti, Ta, Zr, Nb, Mn, V, Co, Fe, Cd, Cr, Ga, In, or a combination thereof. The anode can be composed of particles, fibers, wires, tubes, or discs of the multivalent metal or metal alloy that are packed and bonded together by a binder (preferably a conductive binder) to form an anode layer.

We have observed that a select multivalent metal (e.g. Ni, Zn, Be, Mg, Ca, Ba, La, Ti, Ta, Zr, Mn, V, Co, Fe, Cd, Ga, or Cr), when coupled with a presently invented graphite or carbon material having expanded inter-graphene planar spaces, can exhibit a discharge curve plateau or average output voltage at approximately 1.0 volt or higher. This plateau regime of a discharge voltage vs. time (or capacity) curve enables the battery cell to provide a useful constant voltage output. A voltage output lower than 1 volt is generally considered as undesirable. The specific capacity corresponding to this plateau regime is typically from approximately 100 mAh/g (e.g. for Zr or Ta) to above 600 mAh/g (e.g. for Zn or Mg).

A desirable anode layer structure is composed of a network of electron-conducting pathways (e.g. mat of graphene sheets, carbon nano-fibers, or carbon-nanotubes) and a thin layer of the multivalent metal or alloy coating deposited on surfaces of this conductive network structure. Such an integrated nano-structure may be composed of electrically conductive nanometer-scaled filaments that are interconnected to form a porous network of electron-conducting paths comprising interconnected pores, wherein the filaments have a transverse dimension less than 500 nm. Such filaments may comprise an electrically conductive material selected from the group consisting of electro-spun nanofibers, vapor-grown carbon or graphite nanofibers, carbon or graphite whiskers, carbon nano-tubes, nano-scaled graphene platelets, metal nanowires, and combinations thereof. Such a nano-structured, porous supporting material for the multivalent metal can significantly improve the metal deposition-dissolution kinetics at the anode, enabling high-rate capability of the resulting multivalent metal secondary cell.

Figure 1B:
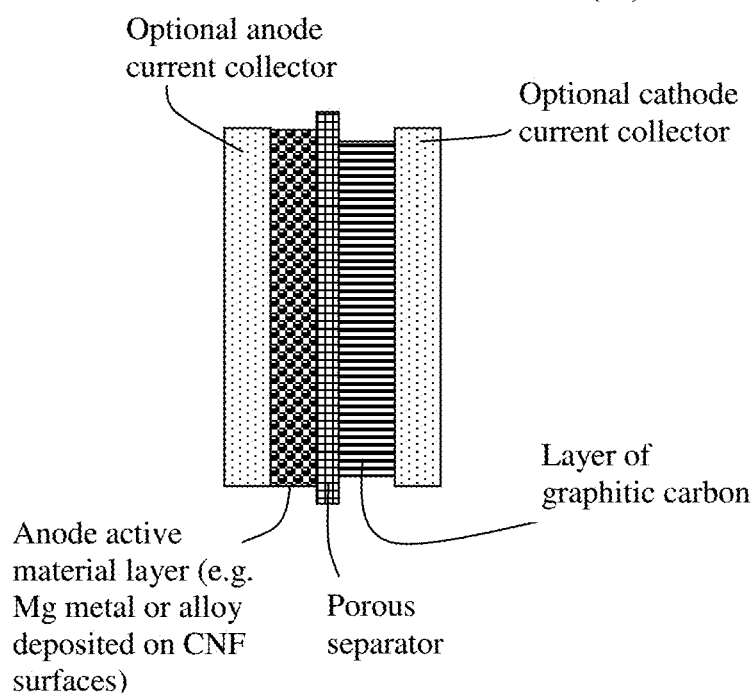
FIG. 1(B) Schematic of a multivalent metal secondary battery cell, wherein the anode layer is a thin multivalent metal coating or foil and the cathode active material layer is composed of graphitic carbon particles or fibers having a protective coating, a conductive additive (not shown), and a resin binder (not shown).

Illustrated in FIG. 1(A) is a schematic of a multivalent metal secondary battery, wherein the anode layer is a thin multivalent metal coating or foil and the cathode active material layer contains a layer of graphitic carbon fibers or particles, an optional resin binder (not shown), and an optional conductive additive (not shown). Alternatively, FIG. 1(B) shows a schematic of a multivalent metal secondary battery cell wherein the cathode active material layer is composed of particles or fibers of a graphitic carbon material and a resin binder (not shown) that helps to bond the particles or fibers together to form a cathode active layer of structural integrity.

The surface treated and/or surface-protected graphitic carbon materials, when implemented as a cathode active material, enable the multivalent metal-ion cell to exhibit a voltage plateau portion in a discharge voltage-time or voltage-capacity curve obtained at a constant current density. This plateau portion typically occurs at a relatively high voltage value intrinsic to a given multivalent metal, and typically lasts a long time, giving rise to a high specific capacity.

The composition of the electrolyte, which functions as an ion-transporting medium for charge-discharge reaction, has a great effect on battery performance. To put multivalent metal secondary batteries to practical use, it is necessary to allow metal ion deposition-dissolution reaction to proceed smoothly and sufficiently even at relatively low temperature (e.g., room temperature).

In the invented multivalent metal-ion battery, the electrolyte typically contains a metal salt dissolved in a liquid solvent. The solvent can be water, organic liquid, ionic liquid, organic-ionic liquid mixture, etc. In certain desired embodiments, the metal salt may be selected from $NiSO_4$, $ZnSO_4$, $MgSO_4$, $CaSO_4$, $BaSO_4$, $FeSO_4$, $MnSO_4$, $CoSO_4$, $VSO_4$, $TaSO_4$, $CrSO_4$, $CdSO_4$, $GaSO_4$, $Zr(SO_4)_2$, $Nb_2(S^O_4)_3$, $La_2(SO_4)_3$, $MgCl_2$, $AlCl_3$, $Mg(ClO_4)_2$, $Mg(BF_4)_2$, Alkyl Grignard reagents, magnesium dibutyldiphenyl, $Mg(BPh2Bu2)2$, magnesium tributylphenyl $Mg(BPhBu3)2$), or a combination thereof.

The electrolyte may in general comprise at least a metal ion salt selected from a transition metal sulfate, transition metal phosphate, transition metal nitrate, transition metal acetate, transition metal carboxylate, transition metal chloride, transition metal bromide, transition metal nitride, transition metal perchlorate, transition metal hexafluorophosphate, transition metal borofluoride, transition metal hexafluoroarsenide, or a combination thereof.

In certain embodiments, the electrolyte comprises at least a metal ion salt selected from a metal sulfate, phosphate, nitrate, acetate, carboxylate, chloride, bromide, nitride, or perchlorate of zinc, aluminum, titanium, magnesium, calcium, manganese, cobalt, nickel, iron, vanadium, tantalum, gallium, chromium, cadmium, niobium, zirconium, lanthanum, or a combination thereof.

In the multivalent metal-ion battery, the electrolyte comprises an organic solvent selected from ethylene carbonate (EC), dimethyl carbonate (DMC), methylethyl carbonate (MEC), diethyl carbonate (DEC), methyl butyrate (MB), ethyl propionate, methyl propionate, propylene carbonate (PC), γ-butyrolactone (γ-BL), acetonitrile (AN), ethyl acetate (EA), propyl formate (PF), methyl formate (MF), tetrahydrofuran (THF), toluene, xylene, methyl acetate (MA), or a combination thereof.

This disclosure is directed at the cathode active layer (positive electrode layer) containing a high-capacity cathode material for the multivalent metal secondary battery. The disclosure also provides such a battery based on an aqueous electrolyte, a non-aqueous electrolyte, a molten salt electrolyte, a polymer gel electrolyte (e.g. containing a metal salt, a liquid, and a polymer dissolved in the liquid), or an ionic liquid electrolyte. The shape of a multivalent metal secondary battery can be cylindrical, square, button-like, etc. The present disclosure is not limited to any battery shape or configuration.

The following examples are used to illustrate some specific details about the best modes of practicing the instant disclosure and should not be construed as limiting the scope of the disclosure.

EXAMPLE 1

Cathode Layer Containing Needle Coke Commercially available needle coke (Jinzhou Petrochemical Co.) was used to prepare cathode active material layers. Both surface treated and non-treated needle coke powders were studied. A sample of surface-treated needle coke (needle-shape coke filaments) was prepared by immersing the filaments in concentrated sulfuric acid for 2 hours to remove the hard carbon skin. The rinsed and dried powder was then mixed with a PVDF binder in a solvent (NMP) to form a slurry, which was coated on a sheet of carbon paper (as a current collector) to form a cathode layer.

EXAMPLE 2

Various Graphitic Carbon and Graphite Materials

Several cathode layers were prepared according to the same procedure as used in Example 1, but the starting graphite materials were powders of highly oriented pyrolytic graphite (HOPG), natural graphite powder, pitch-based graphite fiber, vapor-grown carbon nano-fiber (VG-CNF), and amorphous graphite, respectively.

EXAMPLE 3

Preparation of Graphite Oxide Using a Modified Hummers' Method and Subsequent Wrapping of Amorphous graphite with graphene oxide sheets Graphite oxide was prepared by oxidation of natural graphite flakes with sulfuric acid, sodium nitrate, and potassium permanganate according to the method of Hummers [U.S. Pat. No. 2,798,878, Jul. 9, 1957]. In this example, for every 1 gram of graphite, we used a mixture of 22 ml of concentrated sulfuric acid, 2.8 grams of potassium permanganate, and 0.5 grams of sodium nitrate. The graphite flakes were immersed in the mixture solution and the reaction time was approximately 4 hours at 35° C. It is important to caution that potassium permanganate should be gradually added to sulfuric acid in a well-controlled manner to avoid overheat and other safety issues. Upon completion of the reaction, the sample was then washed repeatedly with deionized water until the pH of the filtrate was approximately 5. The solution was ultrasonicated for 30 minutes to produce graphene oxide suspension.

Powder of amorphous graphite containing micro-crystallites was poured into the graphene oxide suspension to form a slurry. The slurry was spray-dried to form graphene oxide-wrapped amorphous graphite particles (protected particulates). We have observed that the cycle life of protected amorphous graphite particulates (defined as the number of charge/discharge cycles when a 20% reduction of capacity is reached) is significantly longer than that of the unprotected amorphous graphite particles (>3,000 cycles for protected particulates vs. <1,000 cycles for un-protected particles).

EXAMPLE 4

Cathode Active Layer Containing Soft Carbon Particles

Particles of soft carbon were prepared from a liquid crystalline aromatic resin. The resin was ground with a mortar, and calcined at 900° C. for 2 h in a $N_2$ atmosphere to prepare the graphitizable carbon or soft carbon. Soft carbon particles were then surface treated with a 30% aqueous solution of sulfuric acid at room temperature for 2 hours to remove hard carbon skin. The rinsed and dried soft carbon particles were then coated with sulfonated PEEK.

EXAMPLE 5

Petroleum Pitch-Derived Hard Carbon Particles

A pitch sample (A-500 from Ashland Chemical Co.) was carbonized at 900° C. for 2 hours, followed by carbonization at 1,200° C. for 4 hours. A solution of KOH in water (5% concentration) was used to surface-treat the hard carbon particles for the purpose of removing the skin carbon layer of the pitch-based hard carbon particles.

EXAMPLE 6

Meso-Phase Carbon

Optically anisotropic spherical carbon (average particle size: 25 μm, quinoline soluble: 5%) was prepared from coal-based meso-phase pitch by heat treating the pitch at 500° C. for 2 hours, carbonized at 900° C. for 2 hours and then partially graphitized at 2,500° C. for 1 hour. The graphitic carbon particles were then coated with sulfonated polyaniline.

EXAMPLE 7

Multi-Walled Carbon Nanotubes (MW-CNTs) of Different Tube LVengths Powder samples of MW-CNTs (5% by weight) were dispersed in water with a 0.5% by weight of a surfactant to form several suspensions. The suspensions were then ultrasonicated for 30 minutes, 1 hour, and 3 hours, respectively. One of the samples (3 hours) was further ball-milled in a high-intensity mill for 5 hours. The resulting CNT samples have different average CNT lengths (43.5 μm, 3.9 μm, and 0.32 μm, respectively). Some CNTs were protected with phenolic resin which was carbonized.

EXAMPLE 8

Preparation and Testing of Various Multivalent Metal-Ion Cells

The particles or fibers of graphitic carbon materials prepared in Examples 1-7 were separately made into a cathode layer and incorporated into a metal-ion secondary battery. The cathode layer was prepared in the following way. As an example, first of all, 95% by weight of the graphitic carbon fibers or particles with or without surface treatments or coatings were mixed together with PVDF (a binder) in NMP to obtain a slurry mixture. The slurry mixture was then cast onto a glass surface to make a wet layer, which was dried to obtain a cathode layer.

Two types of multivalent metal anode were prepared. One was metal foil having a thickness from 20 μm to 300 μm. The other was metal thin coating deposited on surfaces of conductive nano-filaments (e.g. CNTs) or graphene sheets that form an integrated 3D network of electron-conducting pathways having pores and pore walls to accept a multivalent metal or its alloy. Either the metal foil itself or the integrated 3D nano-structure also serves as the anode current collector.

Cyclic voltammetry (CV) measurements were carried out using an Arbin electrochemical workstation at a typical scanning rate of 0.5-50 mV/s. In addition, the electrochemical performances of various cells were also evaluated by galvanostatic charge/discharge cycling at a current density from 50 mA/g to 10 A/g. For long-term cycling tests, multi-channel battery testers manufactured by LAND were used.

Figure 2:
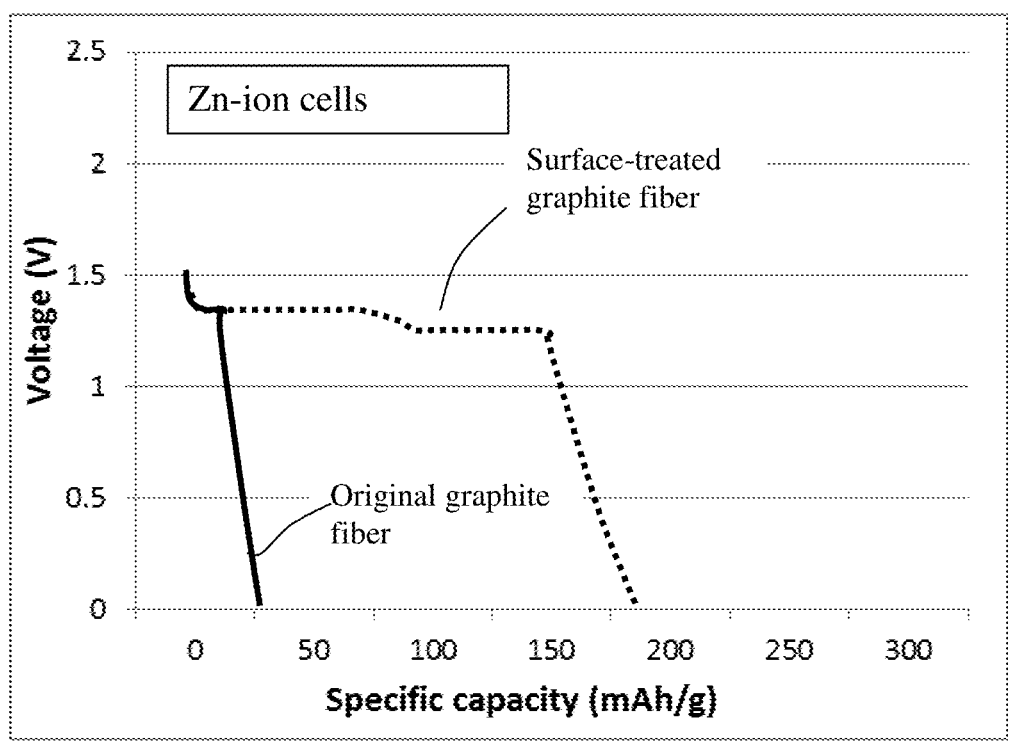
FIG. 2 The discharge curves of two Zn foil anode-based cells; one containing a cathode layer of original graphite fibers and the other a cathode layer of surface-treated graphite fibers having hard carbon skin removed.

FIG. 2 shows the charge and discharge curves of two Zn foil anode-based cells: one Zn-ion cell containing a cathode layer of original graphite fibers and the other a cathode layer of surface-treated graphite fibers having hard carbon skin removed. The discharge curve of the Zn-ion cell featuring skin-free graphite fibers exhibits a longer plateau regime at 1.15-1.35 volts and a higher specific capacity (plateau ending at 150 mAh/g and overall capacity being 180 mAh/g) relative to the cell having a cathode of original untreated graphite fibers (plateau ending at 20 mAh/g and overall capacity being 35 mAh/g). The resulting cell-level energy density is approximately 100 Wh/kg, higher than those of nickel metal hydride and very close to those of lithium-ion batteries. Zinc is more abundant, safer, and significantly less expensive than lithium, nevertheless.

Figure 3:
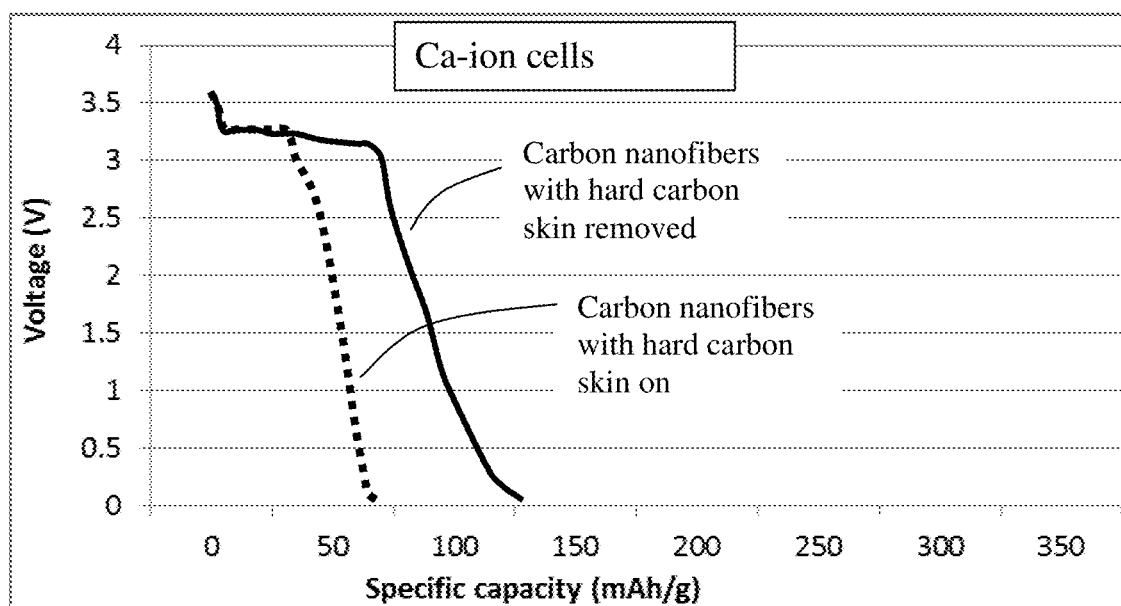
FIG. 3 The discharge curves of two Ca-ion cells: one containing a cathode layer of carbon nanofibers (CNFs) having no hard carbon skin (skin having been chemically etched away) and the other a cathode layer of CNFs having a hard carbon skin.

Shown in FIG. 3 are the discharge curves of two Ca-ion cells: one containing a cathode layer of carbon nanofibers (CNFs) having no hard carbon skin (skin having been chemically etched away) and the other a cathode layer of CNFs having a hard carbon skin. The skin-free CNFs enable a Ca-ion cell to deliver a discharge curve plateau up to 80 mAh/g, as opposed to the mere 30 mAh/g of the cell featuring un-treated CNFs.

Figure 4:
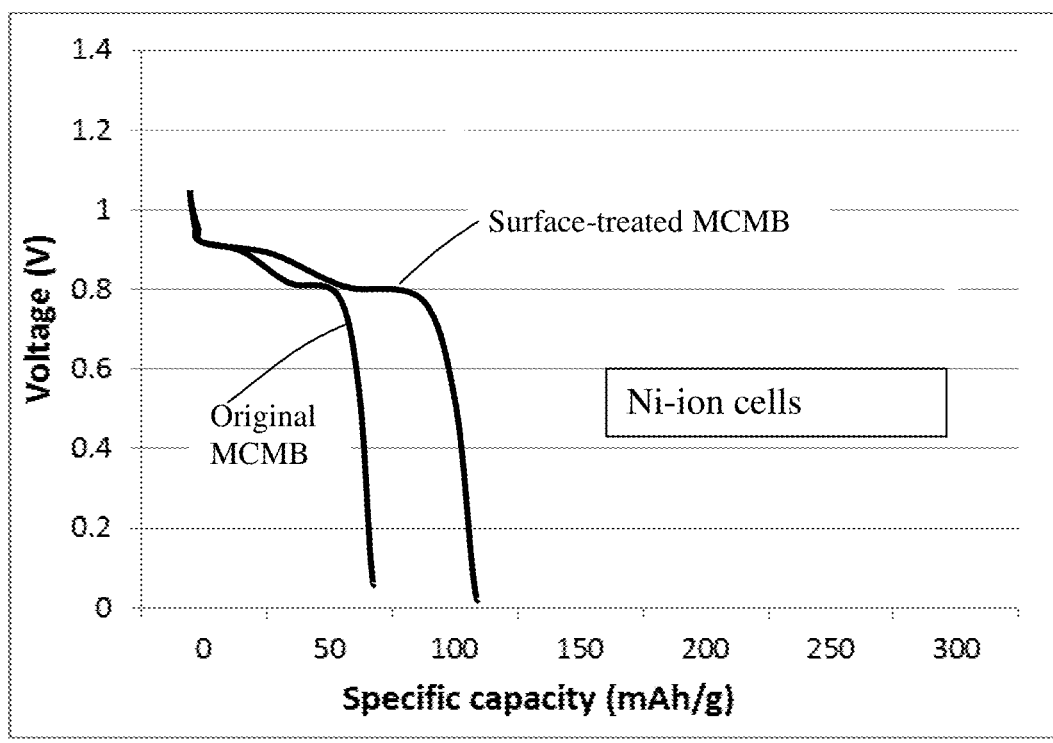
FIG. 4 The discharge curves of two Ni mesh anode-based cells; one containing a cathode layer of original MCMB particles and the other a cathode layer of surface-treated MCMB particles.

FIG. 4 shows the discharge curves of two Ni mesh anode-based cells; one Ni-ion cell containing a cathode layer of original MCMB particles and the other a cathode layer of surface-treated MCMB particles. Again, by removing the hard carbon skin from a graphitic carbon particle, one can significantly increase the ion storage capability, 105 mAh/g vs. 52 mAh/g in this case.

Summarized in Table 1 below are the typical plateau voltage ranges of the discharge curves of a broad array of multivalent metal-ion cells using skin-free artificial graphite, graphite fibers, and CNFs as a cathode active material. The specific capacity is typically from 100 to 250 mAh/g. In contrast, for each type of battery cell, the corresponding graphitic carbon having hard carbon skin provides very limited ion storage capability (typically <50 mAh/g).

TABLE 1

Plateau voltage ranges of the discharge curves in multivalent metal-ion cells.

| Anode Metal | Voltage range |
|---|---|
| Ba | 3.45-3.55 V |
| Ca | 3.25-3.35 V |
| La | 2.84-3.05 V |
| Mg | 2.85-3.01 V |
| Be | 2.36-2.51 V |
| Ti | 2.15-2.22 V |
| Zr | 1.97-2.07 V |
| Mn | 1.77-1.85 V |
| V | 1.74-1.82 V |
| Nb | 1.67-1.73 V |
| Zn | 1.20-1.35 V |
| Cr | 1.16-1.31 V |
| Ta | 1.14-1.25 V |
| Ga | 1.10-1.18 V |
| Fe | 0.96-1.13 V |
| Cd | 0.95-1.10 V |
| Co | 0.88-0.98 V |
| Ni | 0.86-0.95 V |

Figure 5:
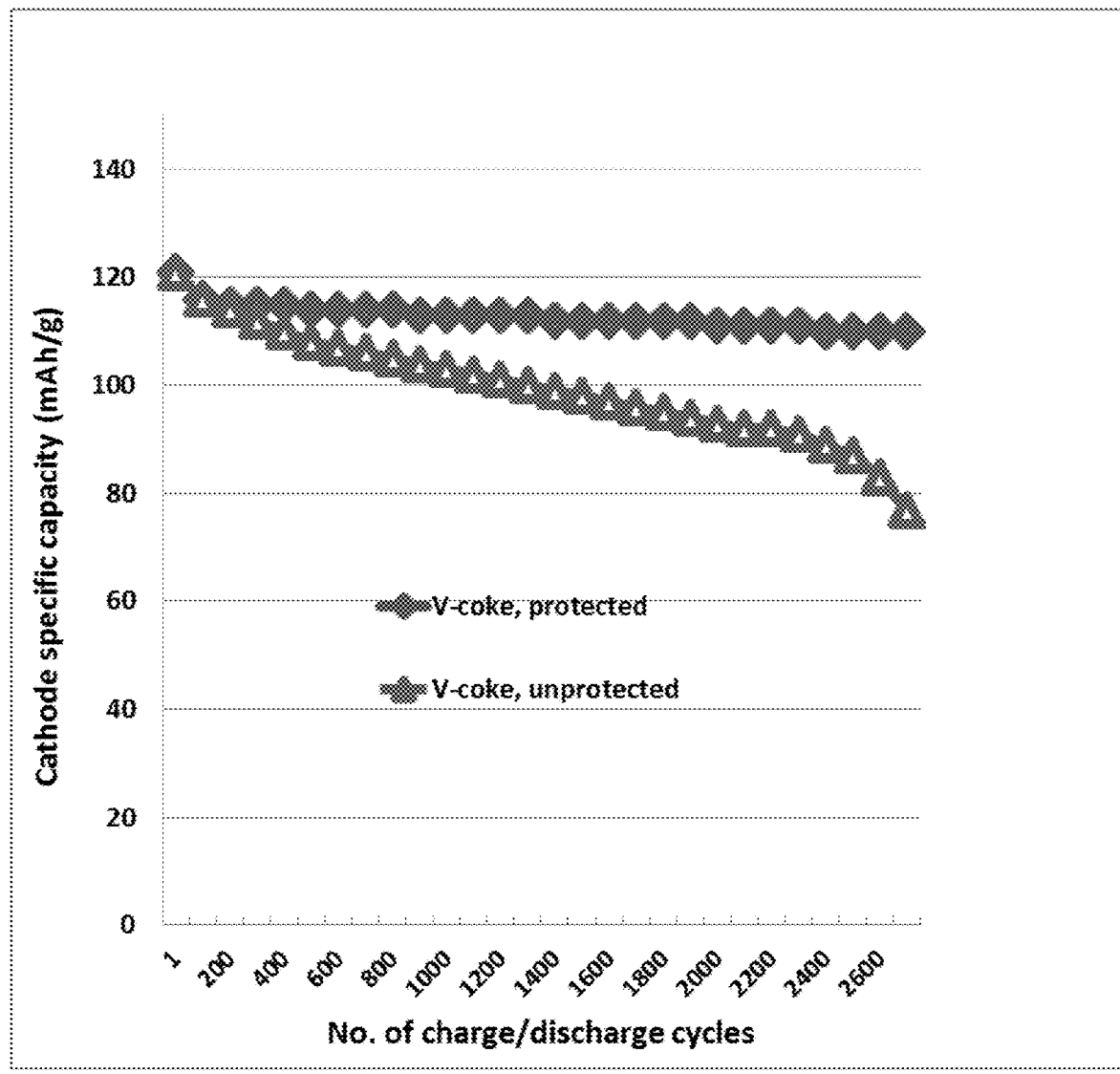
FIG. 5 The specific capacity of two V-needle coke cells (one containing a cathode of sulfonated PVDF-protected needle coke and the other un-protected) plotted as a function of the number of charge/discharge cycles.

FIG. 5 shows the specific capacity of two V-needle coke cells (one V-ion cell containing a cathode of sulfonated PVDF-protected needle coke and the other un-protected) plotted as a function of the number of charge/discharge cycles. These data indicate that the V-ion cell can maintain a 90% capacity over 2500 cycles if the needle coke particles are protected by a select coating. In contrast, the V-ion cell containing un-protected needle coke suffers a 20% reduction in capacity after approximately 1,000 charge/discharge cycles.

Figure 6:
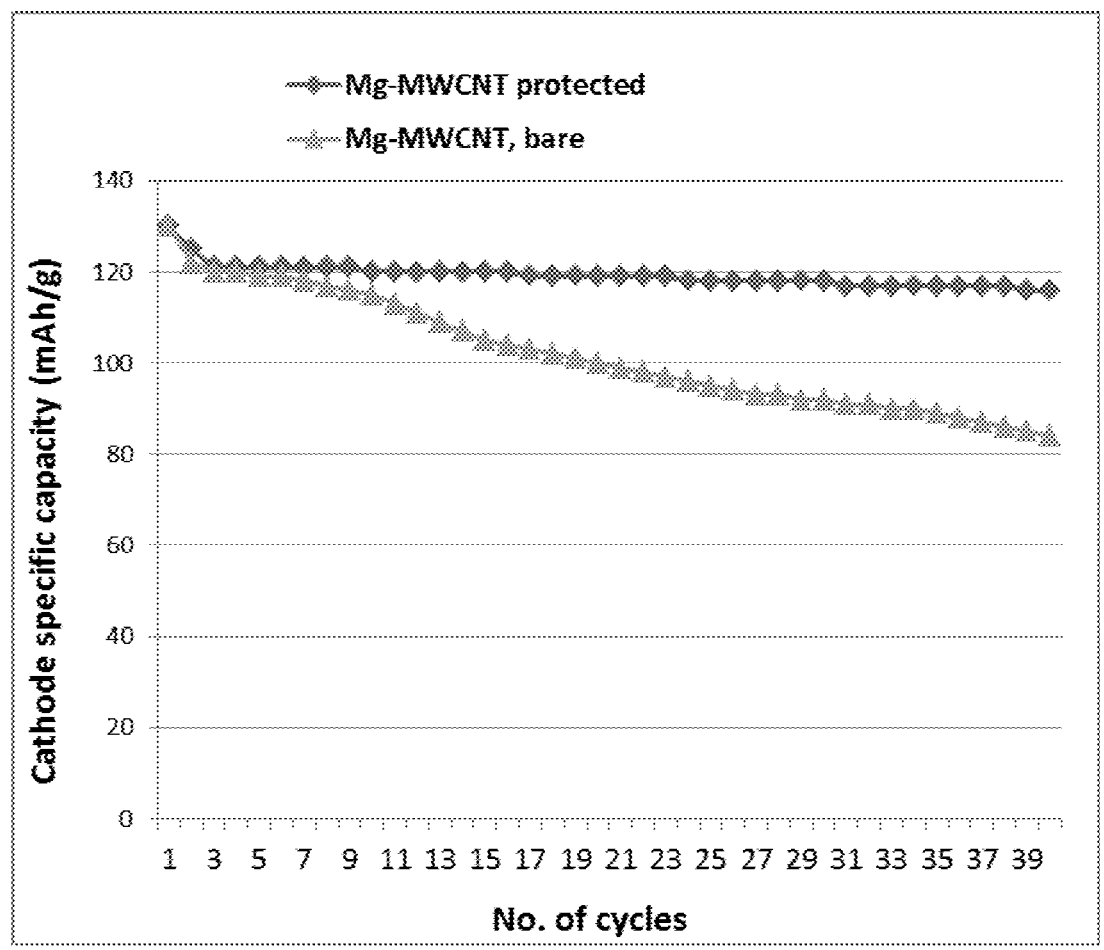
FIG. 6 The specific capacity of two Mg-ion cells, one containing a cathode layer of MWCNTs protected by carbonized phenolic resin and the other un-protected. The electrolyte used was 1 M of $MgCl_2$:Al $Cl_3$ (2:1) in monoglyme.

Similarly, FIG. 6 shows the specific capacity of two Mg-ion cells, one containing a cathode layer of MWCNTs protected by carbonized phenolic resin and the other un-protected. The protected version enables a significantly higher level of cycling stability.

Figure 7:
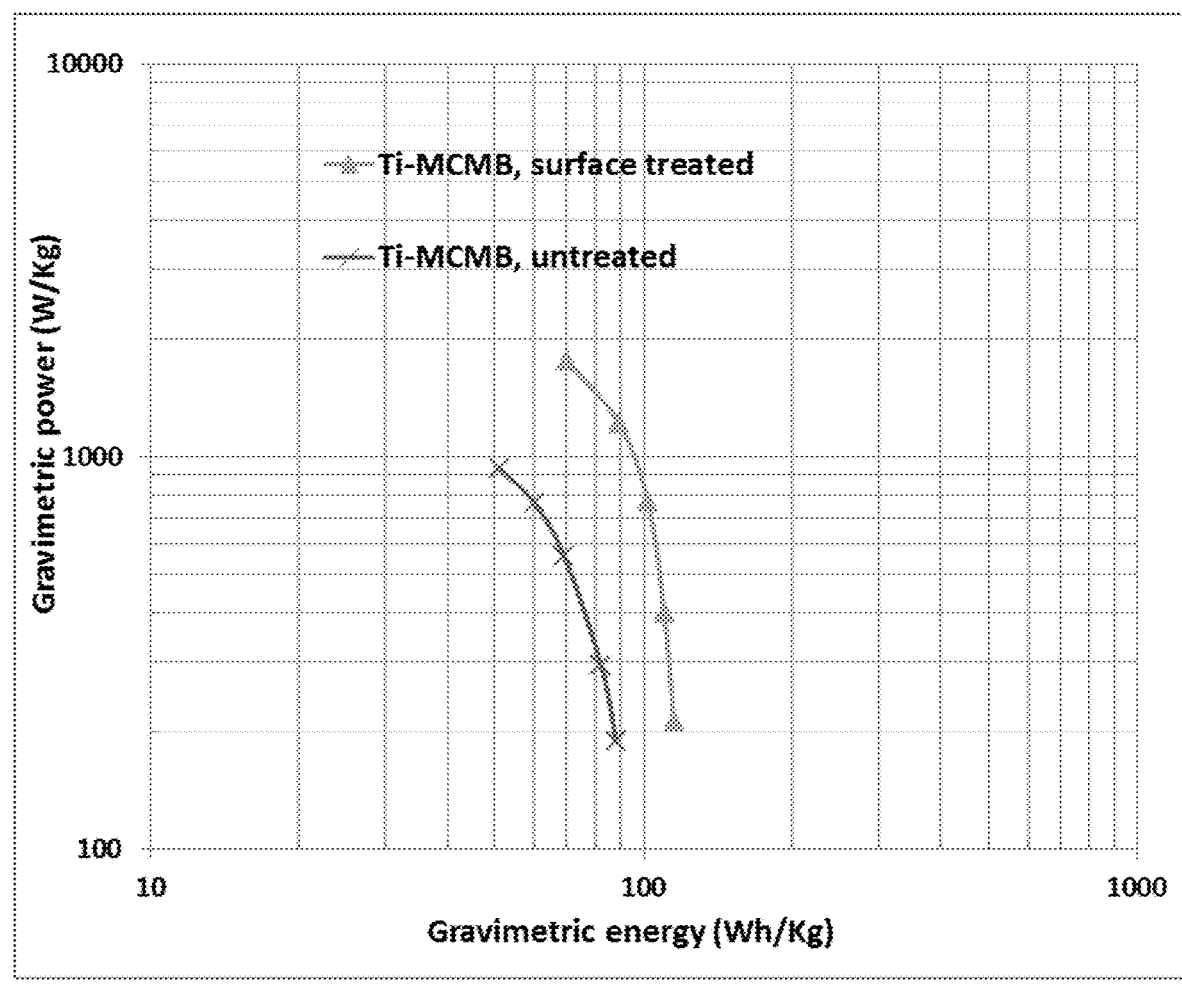
FIG. 7 Ragone plots of two Ti-ion cells, one having a cathode of surface-treated MCMB and the other having untreated MCMB.

Summarized in FIG. 7 are the Ragone plots of two Ti-ion cells, one having a cathode of surface-treated MCMB and the other one untreated MCMB. The treated MCMB beads having their hard carbon skin substantially removed enable the Ti-ion cell to deliver a higher energy density and higher power density.

We have also observed that shorter carbon nanotubes or carbon nano-fibers, when implemented as a cathode active material, lead to a higher energy density and higher power density.

Additionally, we have discovered that by supporting the multivalent metal (in a thin film or coating form) on a nano-structured network composed of interconnected carbon or graphite filaments (e.g. carbon nanotubes or graphene sheets) one can significantly increase the power density and high-rate capability of a metal-ion cell. This nano-structured network of interconnected carbon nano-fibers provides large surface areas to support multivalent metal and facilitate fast and uniform dissolution and deposition of metal cations at the anode side. Other nano-filaments or nano-structures that can be used to make such a network include electro-spun nanofibers, vapor-grown carbon or graphite nanofibers, carbon or graphite whiskers, carbon nano-tubes, metal nanowires, or a combination thereof.

We claim:

1. A method of manufacturing a multivalent metal-ion battery, comprising:
    (a) providing an anode containing a multivalent metal or its alloy, wherein said multivalent metal is selected from Ni, Zn, Be, Mg, Ca, Ba, La, Ti, Ta, Zr, Mn, V, Co, Fe, Cd, Cr, Ga, In, or a combination thereof;
    (b) providing a cathode active layer of graphitic carbon particles or fibers as a cathode active material that intercalates/de-intercalates ions; and
    (c) providing an electrolyte capable of supporting reversible deposition and dissolution of said multivalent metal at the anode and reversible adsorption/desorption and/or intercalation/de-intercalation of ions at the cathode;
    wherein said graphitic carbon particles or fibers are coated with a protective layer selected from carbonized resin, an ion-conducting polymer, an electrically conductive polymer, or a combination thereof; wherein said ion-conducting polymer is selected from the group consisting of sulfonated polymers, polypropylene oxide (PPO), poly bis-methoxy ethoxyethoxide-phosphazene, polydimethylsiloxane, poly(vinylidene fluoride)-hexafluoropropylene (PVDF-HFP), and combinations thereof; wherein said electrically conducting polymer is selected from the group consisting of polyfuran, bi-cyclic polymers, derivatives thereof, and combinations thereof; wherein said protective layer is permeable to ions of said multivalent metal or ions dissolved in said electrolyte and said protective layer prevents or reduces exfoliation of graphitic planes in said graphitic carbon particles or fibers during a charge/discharge cycle of said battery, wherein said graphitic carbon particles or fibers have a hard carbon or amorphous carbon surface that is at least partially removed prior to being coated with said protective layer.

2. The method of claim 1, further including providing a porous network of electrically conductive nano-filaments to support said multivalent metal or its alloy.

3. The method of claim 1, wherein said graphitic carbon particles or fibers in said cathode active layer are selected from meso-phase pitch, meso-phase carbon, mesocarbon micro-beads (MCMB), coke particles/needles, expanded graphite flakes, artificial graphite particles, natural graphite particles, amorphous graphite containing graphite microcrystallites, highly oriented pyrolytic graphite, soft carbon particles, hard carbon particles, multi-walled carbon nanotubes, carbon nano-fibers, carbon fibers, graphite nano-fibers, graphite fibers, carbonized polymer fibers, or a combination thereof.

4. The method of claim 1, wherein said step of providing a cathode active layer includes a procedure of cutting needle coke, carbon nano-fiber, carbon fiber, graphite nano-fiber, graphite fiber, or multi-walled carbon nanotube to obtain graphitic carbon fibers having an average length shorter than 10 μm.

5. The method of claim 1, wherein said graphitic carbon particles or fibers have a hard carbon or amorphous carbon surface that is removed prior to being coated with said protective layer.

6. The method of claim 1, wherein said electrolyte contains an aqueous electrolyte, an organic electrolyte, a polymer electrolyte, a molten salt electrolyte, an ionic liquid, or a combination thereof.

7. A method of manufacturing a multivalent metal-ion battery, comprising:
  (d) providing an anode containing a multivalent metal or its alloy, wherein said multivalent metal is selected from Ni, Zn, Be, Mg, Ca, Ba, La, Ti, Ta, Zr, Mn, V, Co, Fe, Cd, Cr, Ga, In, or a combination thereof;
  (e) providing a cathode active layer of graphitic carbon particles or fibers as a cathode active material that intercalates/de-intercalates ions; and
  (f) providing an electrolyte capable of supporting reversible deposition and dissolution of said multivalent metal at the anode and reversible adsorption/desorption and/or intercalation/de-intercalation of ions at the cathode;
  wherein said graphitic carbon particles or fibers are coated with a protective layer selected from carbonized resin, an ion-conducting polymer, an electrically conductive polymer, or a combination thereof; wherein said ion-conducting polymer is selected from the group consisting of sulfonated polymers, polypropylene oxide (PPO), poly bis-methoxy ethoxyethoxide-phosphazene, polydimethylsiloxane, poly(vinylidene fluoride)-hexafluoropropylene (PVDF-HFP), and combinations thereof; wherein said electrically conducting polymer is selected from the group consisting of polyfuran, bi-cyclic polymers, derivatives thereof, and combinations thereof; wherein said protective layer is permeable to ions of said multivalent metal or ions dissolved in said electrolyte and said protective layer prevents or reduces exfoliation of graphitic planes in said graphitic carbon particles or fibers during a charge/discharge cycle of said battery, wherein said multivalent metal-ion battery has an average discharge voltage no less than 1.0 volts and a cathode specific capacity no less than 125 mAh/g, wherein said graphitic carbon particles or fibers have a hard carbon or amorphous carbon surface that is removed prior to being coated with said protective layer.

* * * * *